(12) United States Patent
Quin et al.

(10) Patent No.: US 11,280,141 B2
(45) Date of Patent: Mar. 22, 2022

(54) VIRTUAL MULTIPHASE FLOWMETER SYSTEM

(71) Applicant: Cameron International Corporation, Houston, TX (US)

(72) Inventors: David Quin, Longford (IE); Edmund Peter McHugh, County Longford (IE)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

(21) Appl. No.: 16/519,481

(22) Filed: Jul. 23, 2019

(65) Prior Publication Data

US 2021/0025740 A1    Jan. 28, 2021

(51) Int. Cl.
| | | |
|---|---|---|
| E21B 21/08 | (2006.01) | |
| G01F 1/40 | (2006.01) | |
| G01F 15/02 | (2006.01) | |
| G01F 25/00 | (2022.01) | |
| G01F 15/00 | (2006.01) | |
| G01F 1/36 | (2006.01) | |
| E21B 47/07 | (2012.01) | |

(52) U.S. Cl.
CPC ............. *E21B 21/08* (2013.01); *E21B 47/07* (2020.05); *G01F 1/363* (2013.01); *G01F 1/40* (2013.01); *G01F 15/005* (2013.01); *G01F 15/022* (2013.01); *G01F 25/0007* (2013.01)

(58) Field of Classification Search
CPC .......... E21B 47/00; E21B 47/04; E21B 47/06; E21B 49/08; E21B 47/10; E21B 28/00; G01F 1/66; G01N 27/02
See application file for complete search history.

(56) References Cited

U.S. PATENT DOCUMENTS 6,234,030 B1 * 5/2001 Butler ................... E21B 21/01
73/195
8,065,923 B2   11/2011 Duhanyan et al.
(Continued)

FOREIGN PATENT DOCUMENTS

WO    2008106544 A2    9/2008

OTHER PUBLICATIONS

Kittilsen, et al., "Stabilized and Increased Well Production Using Automatic Choke Control," presented at the Abu Dhabi International Petroleum Exhibition and Conference held in Abu Dhabi, UAE, Nov. 10-13, 2014, SPE171859.
(Continued)

*Primary Examiner* — Tara Schimpf
(74) *Attorney, Agent, or Firm* — Helene Raybaud

(57) ABSTRACT

A technique facilitates monitoring fluid phases of a multiphase flow during, for example, well fluid production operations. According to an embodiment, data may be obtained from devices, such as chokes and pressure sensors. This data is then processed to identify phases of the multiphase well fluid flow. The use of data from such well related devices effectively establishes a virtual multiphase flowmeter. However, the output from the virtual multiphase flowmeter may be calibrated periodically by taking measurements from an actual multiphase flowmeter. In some embodiments, the data from a plurality of flow meters having differing physical operating principles may be correlated in a manner to obtain additional parameters related to the multiphase well fluid flow.

20 Claims, 3 Drawing Sheets

(56) References Cited

U.S. PATENT DOCUMENTS

| | | | |
|---|---|---|---|
| 2008/0060846 A1 | 3/2008 | Belcher et al. | |
| 2008/0306892 A1 | 12/2008 | Crossley et al. | |
| 2011/0303019 A1* | 12/2011 | Gysling | G01F 1/712 |
| | | | 73/861.07 |
| 2012/0216625 A1 | 8/2012 | Bruno et al. | |
| 2014/0076547 A1 | 3/2014 | Unalmis et al. | |
| 2018/0080317 A1* | 3/2018 | Hopper | E21B 47/10 |
| 2018/0347338 A1* | 12/2018 | Abbad | G01F 1/74 |

OTHER PUBLICATIONS

Krakowiak, "Virtual metering," retrieved on Jul. 23, 2019 at https://www.oedigital.com/susea/item/15890-virtual-metering.

Tangen, et al., "Virtual Flow Meter—Sensitivity Analysis," retrieved on Jul. 23, 2019 at https://nfogm.no/wp-content/uploads/2018/04/13-Virtual-Flow-Meter-Sensitivity-Analysis_Kongsberg-Digital.pdf.

International Search Report and Written Opinion issued in the PCT Application PCT/2020/041437, dated Oct. 30, 2020 (13 pages).

* cited by examiner

VIRTUAL MULTIPHASE FLOWMETER SYSTEM

BACKGROUND

In a variety of well applications, a wellbore is drilled into a subterranean formation containing a reservoir of hydrocarbon fluids, e.g. oil and natural gas. Various well treatment operations may be performed to enhance production of the hydrocarbon fluids. Additionally, well completions and other types of well equipment may be deployed downhole or downstream to facilitate production. The well equipment may include downhole, downstream, and surface sensors to obtain data on parameters related to formation conditions and/or fluid flow. For example, multiphase flowmeters may be used to determine data on the phases of the hydrocarbon fluid being produced. However, existing multiphase flowmeters can be expensive and may have limitations with respect to obtaining real-time data in certain well operations.

SUMMARY

In general, a system and methodology are provided for monitoring fluid phases of a multiphase flow during, for example, well fluid production operations. According to an embodiment, data may be obtained from devices, e.g. a flow restriction system with pressure sensors or other suitable sensors, located downstream, downhole, at the surface, and/or at other suitable locations along the fluid flow. This data is then processed to identify phases of the multiphase well fluid flow. The use of data from such devices effectively establishes a virtual multiphase flowmeter. However, the output from the virtual multiphase flowmeter may be calibrated periodically by taking measurements from an actual multiphase flowmeter. In some embodiments, the data from a plurality of flowmeters having differing physical operating principles may be correlated in a manner to obtain additional parameters related to the multiphase well fluid flow.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
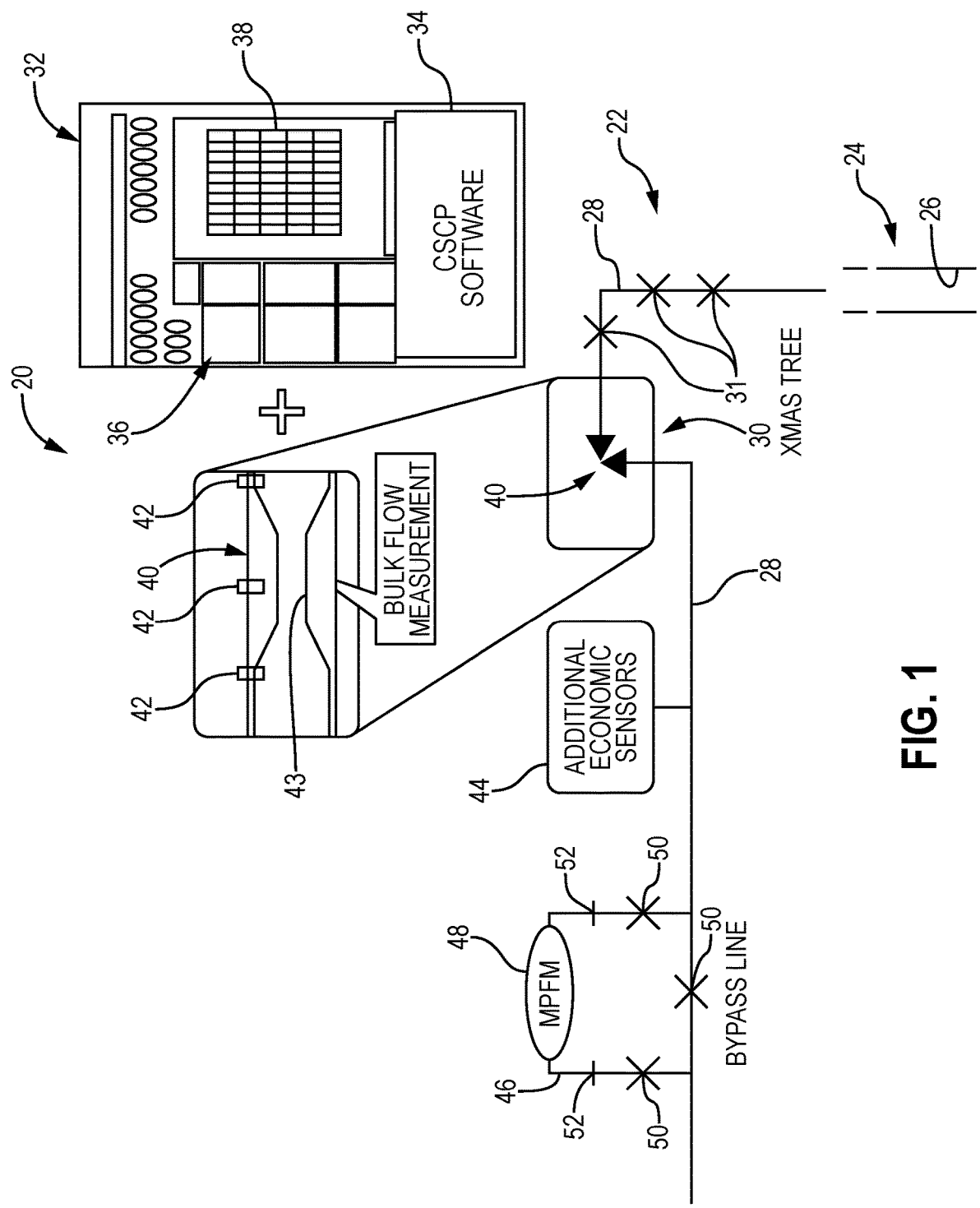
FIG. 1 is a schematic illustration of an example of a virtual multiphase flowmeter, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology to help monitor fluid phases of a multiphase flow during, for example, well fluid production operations. According to an embodiment, data may be obtained from devices, e.g. a flow restriction system with pressure sensors or other suitable sensors, located downstream, downhole, at the surface, and/or at other suitable locations along the fluid flow. Examples of flow restrictions include chokes, valves, and elbows. The devices selected may be components which are already part of the well completion or other downhole equipment. Data obtained from this equipment may be processed in a manner to provide accurate phase data with respect to the phases of a multiphase well fluid being produced.

Use of data from such devices/equipment effectively establishes a virtual multiphase flowmeter. However, the output from the virtual multiphase flowmeter may be calibrated periodically by taking measurements from an actual multiphase flowmeter. In some embodiments, the data from a plurality of flowmeters having differing physical operating principles may be correlated in a manner to obtain additional information, e.g. additional fluid parameters, related to the multiphase well fluid flow.

The virtual multiphase flowmeter provides an economical approach for obtaining multiphase flow measurements by utilizing relatively inexpensive equipment and/or equipment that may already be installed downhole. Periodic calibration may be obtained via various multiphase flow meters such as the Vx Spectra multiphase flowmeter available from Schlumberger. Such a multiphase flowmeter may be connected in line to determine, for example, the oil/water/gas/chemical/other constituent mixture composition. The information/data obtained by the multiphase flowmeter may be processed via, for example, choke sizing software to insure the virtual multiphase flowmeter is accurately calibrated. When accurately calibrated, the virtual multiphase flowmeter is able to determine accurate phase data on the multiphase flow rate in real time based on data obtained from the devices/equipment. Examples of data obtained from the devices/equipment may include valve pressure drops and valve opening positions for a valve or other flow restrictions disposed along a flowline of the multiphase well fluid.

Additionally, economic sensors such as conductivity sensors or downstream temperature sensors may be employed to help monitor composition of the flowing multiphase well fluid in addition to or in the absence of the periodic multiphase flowmeter. These types of sensors may be part of the well equipment or may be added to the flowline along which the multiphase well fluid flows. The data from such sensors may be used alone to help confirm or increase the accuracy of the virtual multiphase flowmeter; or such sensors may be used in combination with the periodic use of the conventional multiphase flowmeter.

In some embodiments, a plurality of flowmeters operating according to differing physical principles may be deployed along the same flowline. Correlation of data from the differing flow meters enables determination of additional parameters, e.g. salient flow-related physical properties. Examples of such flow-related physical properties include thermal properties, conductivity properties, viscosity properties, density properties, hydrocarbon chemical structure properties, and identification of flowing matter properties.

Referring generally to FIG. 1, an example of a virtual multiphase flowmeter 20 is illustrated. In this example, the virtual multiphase flowmeter 20 incorporates devices, e.g. elements/components, of a well system 22 used for producing hydrocarbon-based fluids from a well 24. As illustrated, the well 24 may comprise a wellbore 26 from which multiphase well fluids are produced up through a flow line 28 which may deliver the well fluid through a Christmas tree 30. A plurality of valves 31 may be positioned along the flowline 28 within and/or upstream of the Christmas tree 30.

The virtual multiphase flowmeter 20 may incorporate a variety of elements/components to obtain data which may be processed on a processing system 32 to determine phase related data regarding the various phases of the produced, multiphase well fluid. The processing system 32 may be a computer-based processing system utilizing appropriate software 34, such as choke sizing and configuration (CSCP) software. The processing system 32 also may comprise data input features 36 which may incorporate a keyboard, touchscreen, or other suitable input device. Additionally, the processing system 32 may comprise a display 38 for displaying data regarding the various phases of the multiphase fluid.

By way of example, the elements/components of the virtual multiphase flowmeter 20 may comprise a flow restriction 40, e.g. a choke, valve, or elbow, which may be used to obtain a bulk flow measurement. Furthermore, the flow restriction 40 may be positioned in the Christmas tree 30 or at another suitable positions along the flow line 28. The flow restriction 40 includes a suitable sensor or sensors 42 to enable, for example, bulk flow measurement. This information is provided to the processing system 32 which uses software 34 to process the bulk flow data for determining phase related data with respect to the well fluid. By way of example, the sensors 42 may include pressure sensors upstream and downstream of a flow restricted area 43, e.g. a Venturi area. Sensors 42 also may comprise temperature sensors, flowrate sensors, and other types of sensors.

A variety of additional sensors 44 also may be positioned along the flow line 28 and data from these additional sensors 44 may be combined with data from the flow restriction 40 to further enhance accurate determination of phase data. By way of example, the additional sensors 44 may comprise conductivity sensors, temperature sensors, pressure sensors, and/or other suitable sensors.

In the embodiment illustrated, the flow line 28 is coupled with a bypass line 46. A multiphase flowmeter 48 may be connected along the bypass line 46. Flow along the flow line 28 and bypass line 46 may be controlled via valves 50. The multiphase flowmeter 48 may be a currently available multiphase flowmeter such as the Vx Spectra multiphase flowmeter available from Schlumberger. The multiphase flowmeter 48 may be used periodically for periodic calibration of the virtual multiphase flowmeter 20. By way of example, a conventional flowmeter 48 may be periodically coupled into bypass line 46 via couplers 52.

Depending on the components used in virtual multiphase flowmeter 20, the software 34 may be programmed to enable use of valves or other flow restrictions 40 as differential pressure flowmeters. The output from virtual multiphase flowmeter 20 may be checked/improved via periodic use of multiphase flowmeter 48. For example, the multiphase flowmeter 48 may be connected/used periodically, e.g. every month, every three months, every six months, or other suitable period or timeframe.

In some embodiments, the conventional multiphase flowmeter 48 (or an interim separator) may be added temporarily to the bypass line 46 to determine, for example, the oil/water/gas/chemical/other mixture composition. This data may be processed via software 34 to ensure accurate operation of the virtual multiphase flowmeter 20. For example, the data may be used to ensure accurate determination of the multiphase fluid flow rate based on the pressure drop of the flow restriction 40 and the opening position of the flow restriction 40 (virtual multiphase flowmeter 20 is enabled via data from the flow restriction 40).

In this manner, the virtual multiphase flowmeter 20 may be used to provide real-time output data regarding phases of the multiphase fluid flow. The additional sensors 44, e.g. economic sensors such as conductivity or downstream temperature sensors, may be used to further monitor fluid composition. The additional sensors 44 may be employed along with the multiphase flowmeter 48 or in the absence of the multiphase flowmeter 48.

Figure 2:
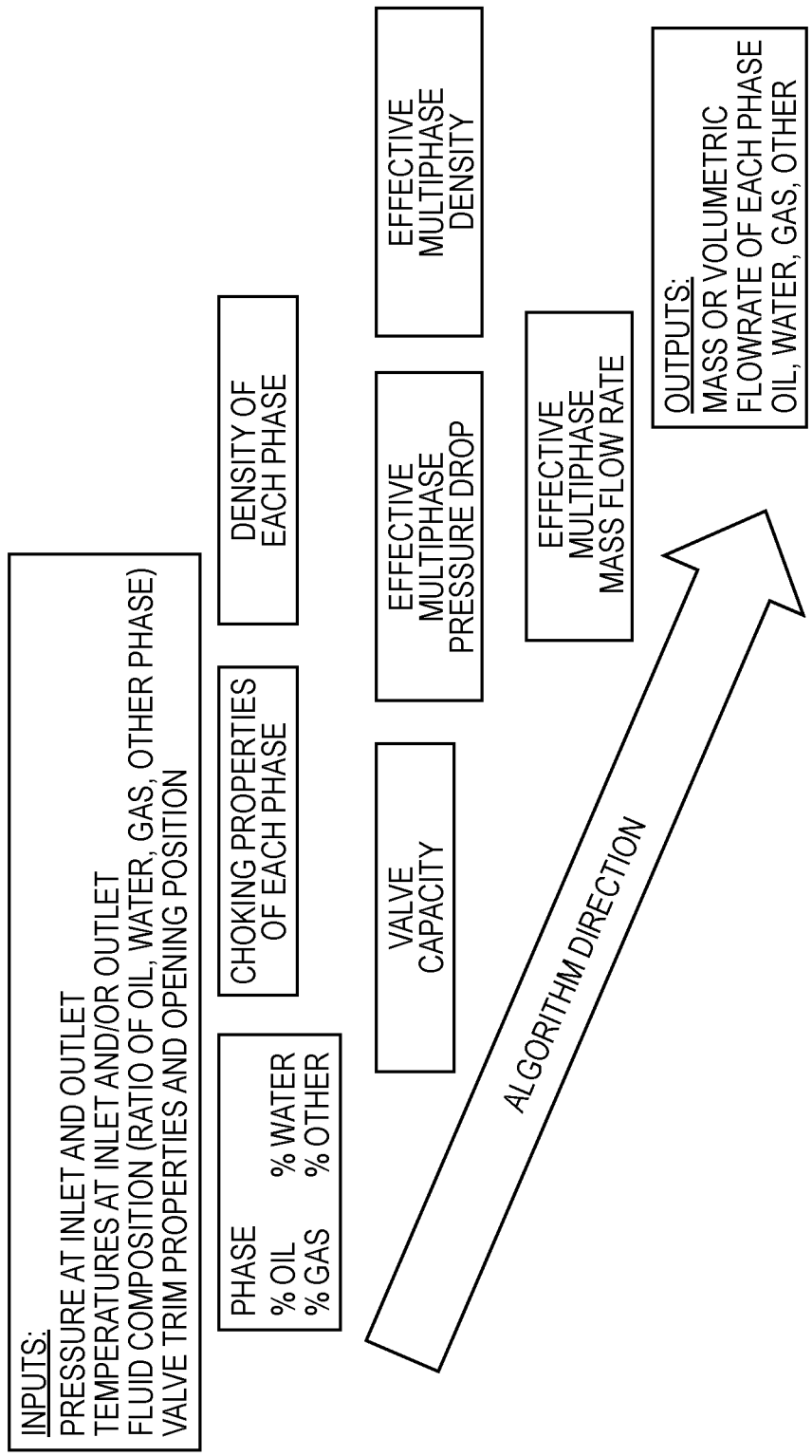
FIG. 2 is a flow map illustrating an example of data collection and operation of the virtual multiphase flowmeter, according to an embodiment of the disclosure.

Effectively, the flow restriction 40 serves as a choke which may be used as a bulk flow measurement device in combination with software 34 to provide the virtual multiphase flowmeter 20. Referring generally to FIG. 2, a flow map is provided to show the types of data input to the virtual multiphase flowmeter 20 and the processing of such data via software 34 to provide desired outputs. As illustrated, various inputs may be supplied to processing system 32 and software 34, e.g. inlet and outlet pressures at flow restriction 40, temperatures at the inlet and/or outlet of flow restriction 40, fluid composition, valve trim properties and opening position (if flow restriction 40 is a valve). The possible phases also may be entered, such as oil, gas, water, or other phases.

Additionally, the software 34 may be programmed with the choking properties of each phase as well as the flow capacity of flow restriction 40, e.g. valve capacity. The processing system 32/software 34 also may be supplied with information such as the density of each phase, the effective multiphase pressure drop, the effective multiphase density, and the effective multiphase flowrate. With this information, the software 34 may be used to output desired parameters/information regarding the phases of the multiphase fluid flow in real-time. Examples of such outputs include the master volumetric flow rate of each phase, e.g. each oil/water/gas/other type of phase.

It should be noted that correlation of a plurality of flowmeters 48 of differing physical principles (positioned on the same flowline) enables determination of salient flow physical properties, e.g. thermal conductivity properties, viscosity properties, density properties. By way of example, the flowmeters operating according to differing physical principles may comprise thermal flowmeters, ultrasonic flowmeters, Coriolis flowmeters, pressure drop flowmeters.

When using a plurality of flowmeters 48, the flow rate reading from the plurality of flowmeters should be the same if on the same flowline (or the readings should make sense given the position of the flowmeters on a network diagram, e.g. on a fork). Correlating the flow meter readings enables determination of salient physical properties, e.g. properties such as density, molecular weight, composition, and type of constituent. Such correlation techniques may be used on gas, liquid, or multiphase fluid.

Figure 3:
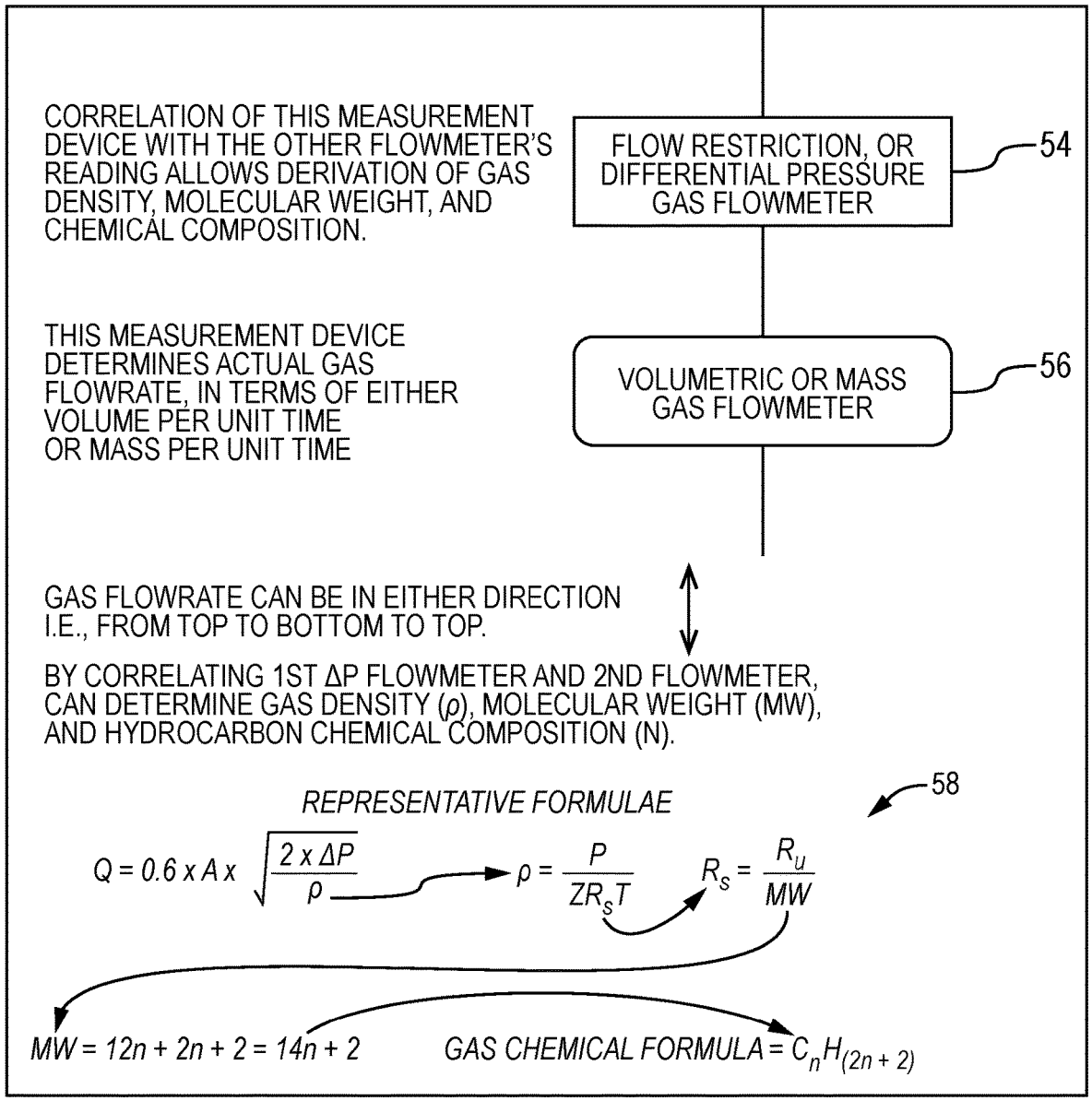
FIG. 3 is a schematic illustration of an example of a correlation technique for utilizing data obtained from different types of flowmeters to determine flow related parameters of a multiphase well fluid flow, according to an embodiment of the disclosure.

Referring generally to FIG. 3, a schematic example is illustrated showing a first flowmeter 54 and a second flowmeter 56 operating on differing physical principles. The flowmeters 54, 56 may be used to enable economical determination of salient gas properties (or other phase properties). Depending on the embodiment, the flowmeters 54, 56 may use two flowmeters, e.g. two conventional flowmeters 48, positioned in series along flowline 28; or the flowmeters 54, 56 may be established by the addition of a flowmeter before or after an existing flow restriction type flowmeter, e.g. flow restriction 40.

For example, the first flowmeter 54 may be in the form of flow restriction 40 (combined with sensor or sensors 42) and the second flowmeter 56 may be another flowmeter such as conventional flowmeter 48. According to an embodiment, the second flowmeter 56 may be used to determine a gas flow rate in either mass per unit time or volume per unit time. Additionally, the natural physical equations for turbulent flow through the first flowmeter 54, e.g. flow restriction 40, allows the measured flowrate data to derive a gas density. Knowing the density, pressure, and temperature of the gas allows derivation of its molecular weight, thereby yielding information on its chemical composition, e.g. methane CH4 or propane C3H8, and value.

In FIG. 3, the standard equations 58 provide an example of formulas which may be used by processing system 32 to determine, for example, density, molecular weight, and hydrocarbon chemical composition. In the equations 58:
Q is flowrate;
A is flow section area;
P is pressure;
ρ is density;
Z is compressibility factor;
R is gas constant;
T is temperature;
MW is molecular weight; and
n is hydrocarbon chemical composition.
It should be noted the flow of fluid, e.g. gas, may be in either direction through the flowmeters 54, 56.

The virtual multiphase flowmeter 20 provides a low-cost approach to obtaining at least a qualitative measurement of a multiphase fluid. Such qualitative measurements may be obtained in real-time which helps optimize production from a well. The qualitative measurement information also can be used to provide alerts with respect to undesirable production profiles arising at a given well and/or to identify appropriate chemical injection treatments and other activities to enhance well fluid production.

In some embodiments, the use of a plurality of flowmeters also provides an economical approach for determining parameters/characteristics such as gas density, molecular weight, and hydrocarbon chemical composition. The information obtained may be used for condition monitoring, flow assurance, enhanced oil recovery, gas lift, and/or enhanced physical measurement. The dual flowmeter methodology enables determination of gas flow density cheaply and robustly. For example, when gas flow is measured with an installed volumetric flowmeter, e.g. ultrasonic flow meter, use of the second flowmeter enables determination of mass or standard temperature and pressure (STP) flowrate. In some embodiments, a mass flowmeter may be installed, e.g. a Coriolis flowmeter, and the use of the second flowmeter enables determination of actual volumetric flow rate. Such combined use of flowmeters may also be employed as a backup system for flow measurement in the event of the volumetric/mass flowmeter failing, thus increasing system reliability.

The components of virtual multiphase flowmeter 20 and well system 22 may have a variety of configurations. For example, the flow restriction 40 may be in the Christmas tree 30, downstream of the Christmas tree 30, or at another suitable location. Additionally, the bypass line 46 and multiphase flowmeter 48 may be positioned at various locations along flowline 28. The additional sensors 44 also may be at a variety of suitable locations, e.g. locations upstream and/or downstream of flow restriction 40.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for use at a well, comprising:
a flowline through which well fluid flows from the well;
a virtual multiphase flowmeter disposed along the flowline, the virtual multiphase flowmeter having:
a flow restriction and at least one sensor proximate the flow restriction to obtain bulk flow data; and
a processor system receiving data from the at least one sensor, the processor system being configured to process the data to determine phase related information regarding the well fluid; and
a multiphase flowmeter through which the well fluid is periodically routed in series with the virtual multiphase flowmeter, the data from the multiphase flowmeter being processed by the processor system to calibrate and improve accuracy of the virtual multiphase flowmeter;
wherein the flow restriction serves as a choke to obtain the bulk flow data and the processor system processes the bulk flow data.

2. The system as recited in claim 1, wherein the flow restriction comprises a valve.

3. The system as recited in claim 1, wherein the flow restriction comprises a choke valve.

4. The system as recited in claim 1, wherein the at least one sensor comprises a plurality of pressure sensors positioned to measure a pressure drop across the flow restriction.

5. The system as recited in claim 4, wherein the at least one sensor further comprises a temperature sensor.

6. The system as recited in claim 1, further comprising a Christmas tree, wherein the flowline extends through the Christmas tree.

7. The system as recited in claim 6, wherein the flow restriction is downstream from the Christmas tree.

8. The system as recited in claim 1, further comprising additional sensors disposed along the flowline.

9. The system as recited in claim 8, wherein the additional sensors comprise a conductivity sensor.

10. The system as recited in claim 8, wherein the additional sensors comprise a pressure sensor.

11. The system as recited in claim 8, wherein the additional sensors comprise a temperature sensor.

12. A method, comprising:
producing a well fluid from a well;
routing the well fluid along a flowline and through a flow restriction;
monitoring parameters of the well fluid moving through the flow restriction to obtain data including bulk flow data;
processing the data to establish a virtual multiphase flowmeter by determining phases of the well fluid; and
periodically using a multiphase flowmeter along the flowline and in series with the virtual multiphase flowmeter to verify phases of the well fluid and to calibrate the virtual multiphase flowmeter;
wherein the flow restriction serves as a choke to obtain the bulk flow data and processing the data comprises processing the bulk flow data.

13. The method as recited in claim 12, wherein routing comprises routing the well fluid through a Christmas tree and then through the flow restriction.

14. The method as recited in claim 12, wherein monitoring comprises monitoring a pressure drop across the flow restriction.

15. The method as recited in claim 12, wherein the multiphase flowmeter is periodically connected to the flowline.

16. The method as recited in claim 12, further comprising processing data from the multiphase flowmeter to improve accuracy with respect to processing the data from the flow restriction to thus improve accuracy of the virtual multiphase flowmeter.

17. The method as recited in claim 12, further comprising obtaining additional well fluid data from additional sensors positioned along the flow line.

18. A method, comprising:
producing a well fluid from a well;
routing the well fluid along a flowline and through a first flowmeter and a second flowmeter, the first flowmeter and the second flowmeter arranged in series, the second flowmeter operating according to a different physical principle than the first flowmeter; and
correlating data from the first flowmeter and the second flowmeter in a manner to determine salient flow physical properties of the well fluid;
wherein the first flowmeter is a virtual flowmeter and the second flowmeter is used periodically to calibrate and improve accuracy of the first multiphase flowmeter.

19. The method as recited in claim 18, wherein routing comprises routing the well fluid through the first flowmeter comprising a flow restriction and through the second flowmeter comprising a volumetric flowmeter.

20. The method as recited in claim 18, wherein routing comprises routing the well fluid through the first flowmeter comprising a flow restriction and through the second flowmeter comprising a mass flowmeter.

* * * * *